June 6, 1944.  C. W. LANG  2,350,778
BORING AND GROOVING ATTACHMENT
Filed April 7, 1943  2 Sheets-Sheet 1

INVENTOR.
CHARLES W. LANG
BY
ATTORNEY

June 6, 1944. C. W. LANG 2,350,778
BORING AND GROOVING ATTACHMENT
Filed April 7, 1943  2 Sheets-Sheet 2
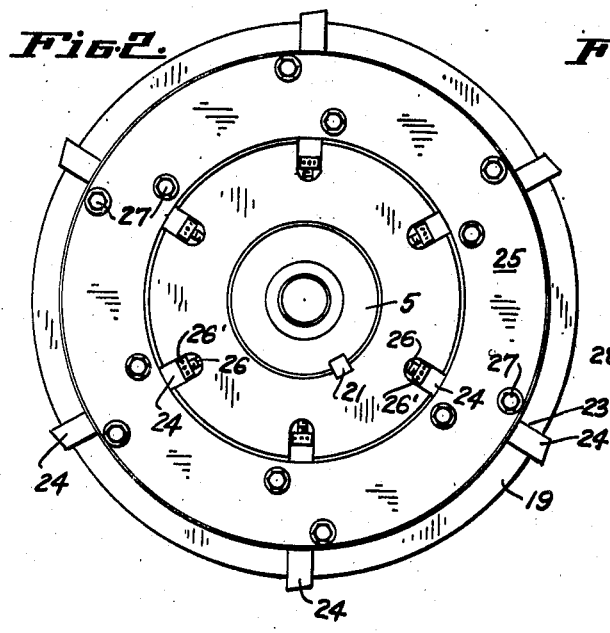
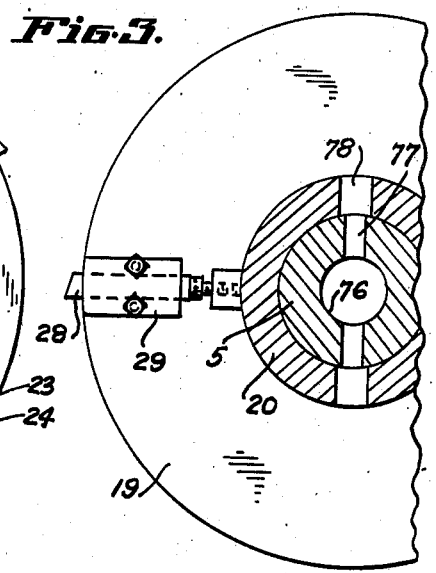
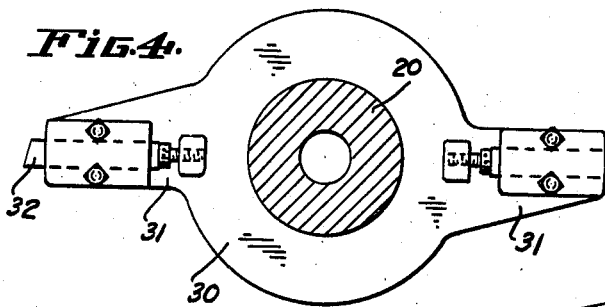
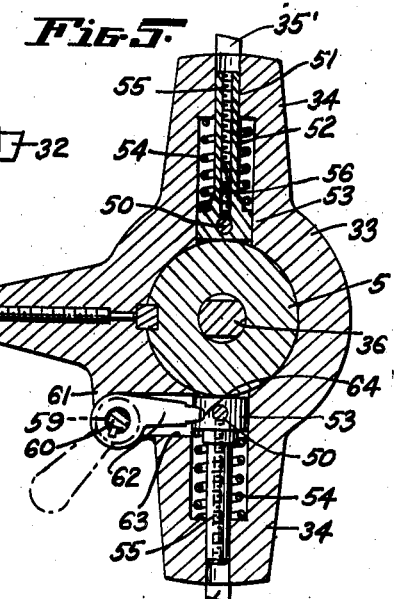
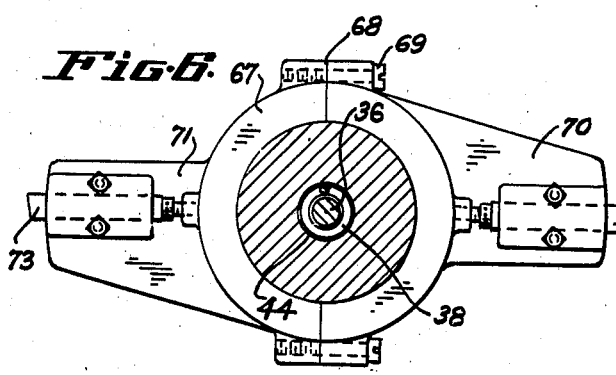
INVENTOR.
CHARLES W. LANG
BY
ATTORNEY.

Patented June 6, 1944

2,350,778

UNITED STATES PATENT OFFICE 2,350,778

BORING AND GROOVING ATTACHMENT

Charles W. Lang, San Francisco, Calif., assignor to Enterprise Engine & Foundry Company, San Francisco, Calif., a corporation of California Application April 7, 1943, Serial No. 482,169

5 Claims. (Cl. 77—58)

This invention relates to machine tools and equipment used in repetition production of engine and other cylinders, and the principal object of the invention is the provision of a cylinder boring and grooving attachment adapted for use with a standard horizontal boring and milling machine, tho it may be used with a vertical mill and in other ways.

Another object is to provide a boring and grooving bar which will, with one setting, and substantially continuous operation, bore out and finish several different internal diameters of the cylinder block and counterbore the larger one, as well as form one or more grooves or internal annular recesses in the wall of one or more of the bores to receive packing rings. Other features and advantages of the invention will appear in the following description and accompanying drawings.

In the drawings:

Fig. 2 is an outer end view of the outermost boring head of the compound tool as seen from the line 2—2 of Fig. 1.

Fig. 3 is a cross section of Fig. 1 taken from the line 3—3 thereof.

Fig. 4 is a cross section of Fig. 1 taken along the line 4—4 thereof.

Fig. 5 is a cross section of the grooving head of the tool as seen from the line 5—5 of Fig. 1.

Fig. 6 is a cross section of the hollow spindle of the tool, and its wedge rod, and front view of the boring and counterboring head as seen from the line 6—6 of Fig. 1.

Figure 1:
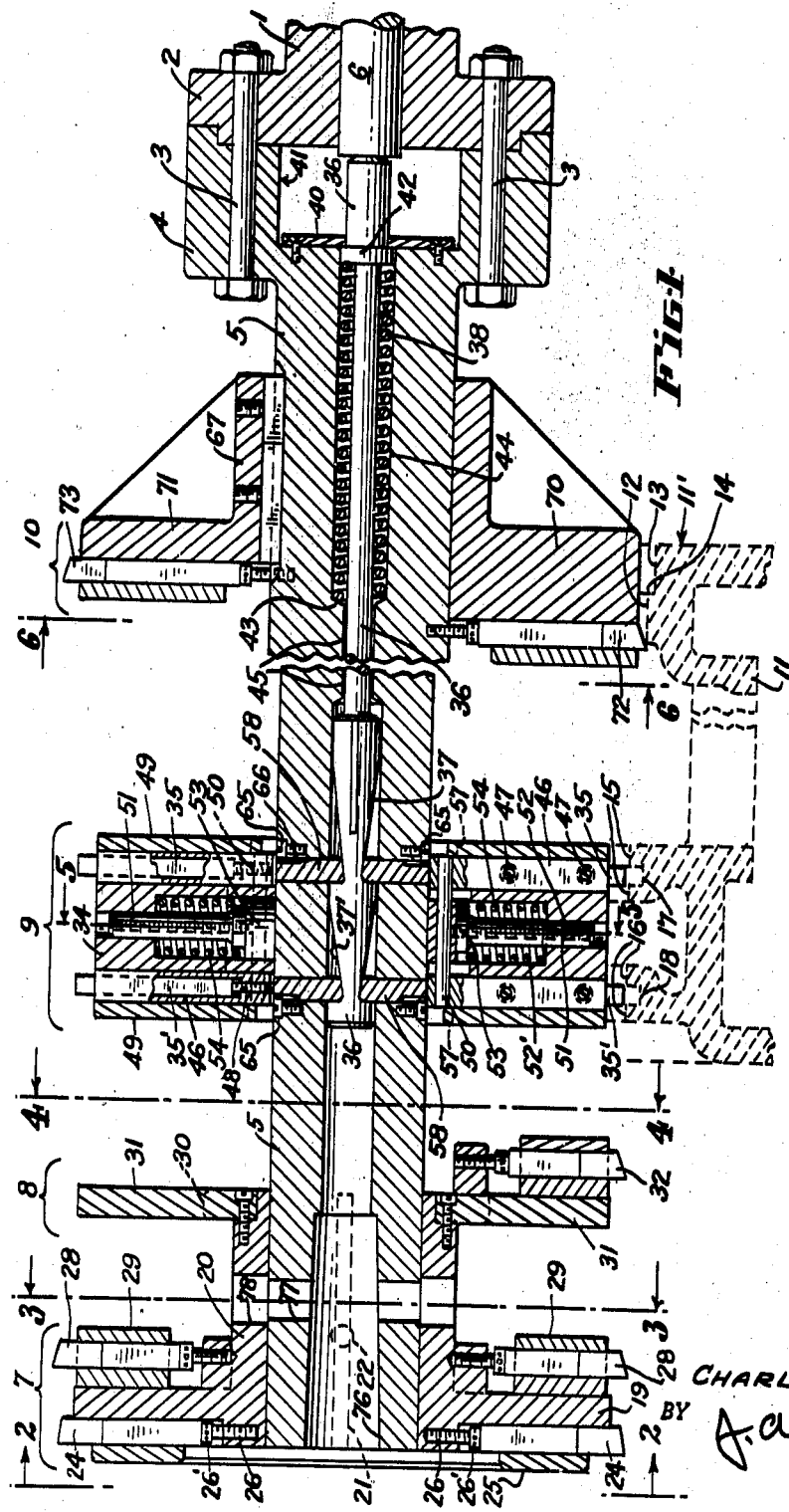
Fig. 1 is a vertical central cross section of a horizontally extending boring and grooving "bar" or attachment, shown bolted to the end of the quill shaft as of a standard horizontal boring and milling machine.

Before describing the drawings in detail it should be stated that the invention is a compound machine tool for the boring out of large engine cylinder blocks for the purpose of inserting the working cylinder sleeves which receive the engine pistons, and since the fit of the tubular sleeves or cylinders in the blocks must be a nice one as the cylinder only makes an annular contact with the block at both ends to allow direct circulating water contact with the major portion of the inserted cylinder, the work must be very accurate.

As the cored out engine blocks must be bored with two different diameters over annular areas at opposite ends all in perfect concentricity, as well as the two annular areas at one end internally circumferentially grooved for packing rings, I have devised a single rigid tool or "bar" to carry out all the required operations in one setting, thus insuring the concentricity of the various diameters, and proper relation of the annular areas for each cylinder, and grooving of some of them, and that the other cylinder receiving openings in the block will be duplicates—all at a great saving in time and labor over the former method of separately boring each area and backing the tools out and applying a separate grooving tool.

As the compound tool or boring bar must be advanced and revolved by power, I have provided an attaching flange at its rear end for bolting it to the outer quill shaft of a standard boring and milling machine as previously mentioned.

In the drawings 1 represents the projecting end of the quill shaft of the boring machine with its attachment flange 2 secured as by bolts 3 to the attaching flange or hub 4 of what will herein be termed the hollow spindle 5 of my compound boring tool, and which tool forms a rigid extension of the boring machine quill shaft.

Within the quill shaft 1 is the boring bar 6 of the boring machine, and it is understood that under control of the boring machine operator the quill can be revolved, extended, and withdrawn, and also the boring bar 6 may be advanced or withdrawn with controlled accuracy by the operator, all as well known and requiring no description as not being a part of the improvement to be described and claimed herein.

The hollow spindle 5 is of a length to reach through the deepest engine block to be machined, those now in use being about six feet long—and at the outer end is a multiple tool boring head 7 for roughing and semi-finishing, while spaced rearwardly is a bore finishing head 8, followed further back by a twin grooving-head 9, and spaced a relatively considerable distance (depending on the depth of the engine block) is a finishing and counterboring head 10.

Before describing the device, herein generally termed a "boring and grooving attachment," attention is called to the lower part of Fig. 1 at 11 where there is shown in dotted lines a fragment of the engine block as bored, grooved, and counterbored by the device or compound tool above it shown in full lines—the engine block fragment and the spindle of the boring and grooving attachment both being broken in length.

In the dotted showing of the engine block it will be seen that the head end 11' is bored at 12 with an annular finished band, and counterbored at 13 to form a shoulder at 14. Also that at the lower or inner end the block is bored with two spaced annular areas 15, 16 both of which are internally grooved as at 17, 18. Bores 15 and 16 are of the same diameter, but bore 12 is slightly larger, and counterbore 13 of course still larger, and shoulder 14 forms a seat or stop for the engine cylinder or liner which is to be of complementary form and tightly pressed into place.

The outer boring head 7 comprises a rigid disk 19 provided with a hub 20 bored to fit the spindle 5 and secured in place as by key and set screw indicated at 21 and 22. The disk is radially grooved on its face as at 23 to receive in each groove a cutting tool 24 clamped in place by an outer ring 25 bolted over them as by screws 27. The inner end of each cutting tool is supported on a screw 26 threaded into the hub 20 and provided with a drilled or castellated head 26′ which can be reached from in front within the opening of the clamping ring, thus permitting fine adjustment of the cutting tools.

Spaced backward from the front row of cutting tools are two or more semi-finish cutting tools 28 held in clamping lugs 29 projecting from the back of disk 19, and spaced still further back and secured to the rear end of hub 20 is a disk 30 formed with arms 31 each carrying a finishing cutting tool 32 clamped in place as explained for the other cutting tools.

Spaced still further back along the spindle and rigidly secured thereto is the grooving-head 9 and which comprises a hub 33 (see Fig. 5) with a pair of relatively wide heavy rigid arms 34 projecting radially at opposite points from the hub and each carrying a pair of spaced groove cutting tools 35 and 35′ spaced to cut the two grooves 17 and 18 indicated in Fig. 1. The four grooving cutters 35 carried by grooving head 9 are retractable into the arms 34 to clear the bore made by the advance cutters 24 and 32, and are simultaneously forced outward to cutting position by means of a wedge rod 36 slidably mounted in the bore of the hollow spindle and which carries two flat wedges 37, 37′ near its outer end, and which rod is normally retracted (to the right in Fig. 1) by a coiled compression spring 38, and when desired forced outward by the boring bar 6 of the boring or milling machine not shown. A plate 40 secured to the spindle within a large counterbore 41 forms a stop for a flange 42 formed on the wedge rod and against which flange one end of the spring 38 reacts while the other is seated against a shoulder 43 formed by an enlargement 44 of the bore 45 of the spindle.

Each grooving tool is rectangular in cross section and is slidably positioned in a rectangular holder 46 and clamped against vibration by headless set-screws 47, and also screw adjustable for controlling their projection from the holder by a screw 48 in the bottom of the holder. The holders themselves are each radially slidable in a rectangular groove formed in the outer sides of the arms 34 and covered by plates 49 suitably secured to the arms as by screws not shown. Each holder extends quite a distance below the lower end of the cutting tool within it and is pierced by a round hole extending parallel with the spindle and through which holes extend pivot pins 50.

Between each pair of grooving tools is a round plunger 51 radially slidable in a suitable bore 52 and which plunger has a large cylindrical head 53 slidable in an enlarged continuation 52′ of bore 52. A spiral compression spring 54 surrounding the plunger urges it inward against the spindle 5. Plunger head 53 is transversely drilled with a hole to receive one of the pivot pins 50 so that as the plunger is urged inward by spring 54 both tool holders 46 will also be forced inwardly or retracted below cutting position so as to pass through the bore as finished by tools on head 8.

Plungers 51 normally terminate somewhat within the outer ends of arms 34 and are centrally drilled and tapped as at 55 and a headless set screw 56 screwed to the bottom to hold pin 50 from displacement. The outer threaded end of the hole is used for screwing in a withdrawing bolt supported on a washer at the end of arm 34 to relieve the tension of spring 54 from pin 50 when desiring to remove them through suitable clearance notches 57 provided in plates 49.

To force the cutting tools outward to cutting position by means of the wedges 37 and 37′ intermediary radially slidable blocks 58 are provided. These blocks slide in slots formed through the wall of the hollow spindle 5 and their inner ends rest respectively upon opposite sides of the wedges, and their outer ends are in contact with the inner ends of the tool holders 46, all so that when the wedge rod 36 is moved outward (to the left in Fig. 1) by means of the boring bar 6 of the milling or boring machine, all four cutting tools will simultaneously be projected to cutting position. This can of course be done gradually under the power or hand feed provided on the boring or milling machine. When the wedge rod is retracted the springs 54 at once withdraw the cutting tools into the arms 34, but if for any reason any of the tools got stuck in the grooves they had cut in the bore of the engine block and the springs 54 were not able to withdraw them, then the tools can be forcibly withdrawn by applying force with a wrench to the squared head 59 of a short shaft 60 rotatably supported in a boss 61 on the outside of hub 33, and which shaft has a short lever 62 keyed to it and projects through an opening 63 in the side of the arm 34 and into a slot 64 formed in the side of head 53 of plunger 51. This construction is the same on both arms 34, and also permits manually working the cutting tools in and out to see if all of their associated parts are free and in good working order.

To prevent the four sliding blocks 58 from falling out when the grooving head 9 is removed from the spindle, or in assembling the same, small retainer screws 65 are screwed into the spindle with their heads each overhanging a groove 66 formed in the side of each block.

Spaced along the spindle, back of the grooving head 9 just described is the finishing and counterboring head 10 which completes the large bore 12 and forms the counterbore 13 at the head end of the cylinder block 11. Head 10 comprises a hub 67 suitably secured to the spindle and preferably split as at 68 and held by bolts 69 so that it may be put on or taken off without interfering with the other heads, and the hub is provided with oppositely extending rigid arms 70, 71, the latter set somewhat back of the former, and each fitted with cutting tools, 72, 73, the first one set to enlarge and finish the bore left by cutters 32, and the second one to cut the counterbore 13, as indicated in Fig. 1 of the drawings.

In operation, the engine block is preferably secured horizontally on its side and the milling or boring machine carrying the compound attachment tool above described is advanced relative to the block to completely bore and groove one cylinder receiving opening after the other with no changing or setting of the tool other than to stop its longitudinal advance into the engine block when the boring is completed, and then operate the wedge rod 36 and simultaneously cut the two grooves 17 and 18. The wedge rod is then retracted to permit the grooving tools to recede into the arms 34, the whole compound tool or attachment is withdrawn, centered over the next cylinder opening of the engine block, and the operation repeated.

In jobs where the engine blocks are very deep provision is made for an extension of the spindle to be supported in any suitable outboard bearing. This provision consists of a taper socket 76 formed in the outer end of the spindle 5 to receive an extension shaft tapered at its rear end to fit the socket, and transversely extending slots 77 and 78 in the spindle and hub 20 to receive a releasing wedge.

Having thus described my improved boring and grooving attachment and explained its use for the purpose intended, what I claim is:

1. A machine tool device comprising a hollow spindle having a forward and a rear end, means at the rear end of the spindle for connecting to a machine for advancing and revolving the spindle, a boring-head adjacent the forward end of the spindle with boring-tools arranged peripherally thereon, a boring-head adjacent the rear end of the spindle with boring-tools arranged peripherally thereon, and an intermediately positioned tool carrying head provided with radially retractable grooving-tools adapted to be advanced forwardly with the spindle into grooving position within a bore made by the forward boring-head, and means for forcing said grooving-tools radially outward for internally grooving said bore comprising a wedge rod slidably positioned within the hollow spindle, and motion transmitting elements arranged to move the grooving-tools outward as the wedge rod is slid, spring means for retracting the wedge rod, and spring means for retracting the grooving-tools into their carrying head.

2. In a boring machine tool including a hollow spindle with a grooving head thereon provided with normally retracted radially slidable grooving tools adapted to be projected for internally grooving a bore, said grooving-tools being arranged in pairs spaced about the grooving-head, the tools of each pair carried in tubular holders radially slidable in sockets formed in the grooving-head, spring means normally retracting the holders and their grooving-tools inwardly to retract the tools, and manually operated means accessible at the grooving-head for positively moving said holders with their tools radially in and out.

3. In a boring machine tool including a hollow spindle with a grooving head thereon provided with normally retracted radially slidable grooving tools adapted to be projected for internally grooving a bore, said grooving-tools being arranged in pairs spaced about the grooving-head, the tools of each pair carried individually in laterally spaced tubular holders radially slidable in sockets formed in the grooving-head, spring means normally retracting the holders and their grooving tools inwardly to retract the tools comprising a spring actuated plunger positioned between each pair of tools slidable parallel therewith and normally urged inwardly, and a rod passing through the inner portion of both holders and plunger forcing the holders to travel as a unit with the plunger.

4. In a boring machine tool including a hollow spindle with a grooving head thereon provided with normally retracted radially slidable grooving tools adapted to be projected for internally grooving a bore, said grooving-tools being arranged in pairs spaced about the grooving-head, the tools of each pair carried individually in laterally spaced tubular holders radially slidable in sockets formed in the grooving-head, spring means normally retracting the holders and their grooving-tools inwardly to retract the tools comprising a spring actuated plunger positioned between each pair of tools slidable parallel therewith and normally urged inwardly, and a rod passing through the inner portions of both holders and plunger forcing the holders to travel as a unit with the plunger, said plunger being accessible at the periphery of said grooving-head and having an axial threaded hole whereby it may be engaged by a bolt and drawn outwardly against its spring pressure.

5. In a boring machine tool including a hollow spindle with a grooving head thereon provided with normally retracted radially slidable grooving tools adapted to be projected for internally grooving a bore, said grooving-tools being arranged in pairs spaced about the grooving-head, the tools of each pair carried individually in laterally spaced tubular holders radially slidable in sockets formed in the grooving-head, spring means normally retracting the holders and their grooving-tools inwardly comprising a spring actuated plunger positioned between each pair of tools slidable parallel therewith and normally urged inwardly, and a rod passing through the inner portions of both holders and plunger forcing the holders to travel as a unit with the plunger, the means for forcing the grooving-tools outwardly comprising a rod slidably positioned in the hollow spindle and carrying two spaced wedges aligned with the inner ends of the tool holders, and blocks radially slidable in slots in the wall of the spindle arranged to transfer motion from said wedges to said tool holders respectively.

CHARLES W. LANG.